(No Model.)

W. S. HOW.
ARTIFICIAL TOOTH CROWN.

No. 288,177. Patented Nov. 6, 1883.

WITNESSES:
Wm A. Skinkle
Henry A. Lamb

INVENTOR:
Woodbury S. How,
By his Attorneys
Baldwin, Hopkins & Peyton

UNITED STATES PATENT OFFICE.

WOODBURY S. HOW, OF PHILADELPHIA, PENNSYLVANIA.

ARTIFICIAL TOOTH-CROWN.

SPECIFICATION forming part of Letters Patent No. 288,177, dated November 6, 1883.

Application filed April 12, 1883. (No model.)

*To all whom it may concern:*

Be it known that I, WOODBURY S. HOW, of the city and county of Philadelphia, in the State of Pennsylvania, have invented certain new and useful Improvements in Artificial Tooth-Crowns, of which the following is a specification.

My invention relates to artificial tooth-crowns for application to natural tooth-roots while in the mouth; and its objects are to provide an improved crown, which may be readily applied to the root securely attached, and which will present an almost, if not quite, natural appearance when properly set.

The particular object of my improvement is to provide a crown which may be readily cut or ground off at its base at any required angle to suit the particular case in hand, and still be capable of secure and permanent attachment to the root.

The subject-matter claimed is particularly pointed out at the close of the specification.

Figure 1:
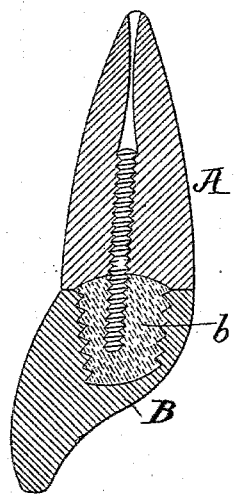
Figure 2:
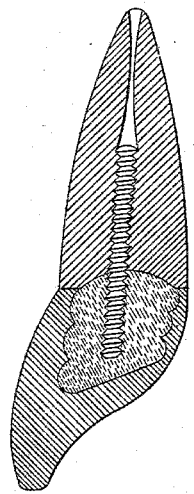
Figure 3:
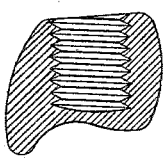
Figure 4:
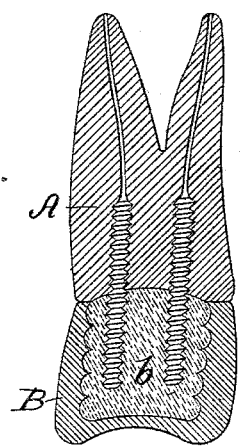
Figure 5:
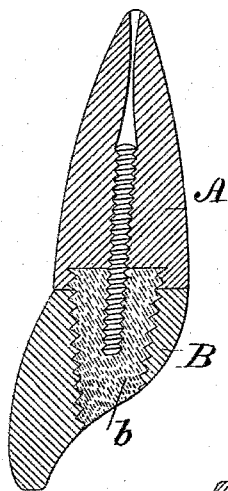
Figure 7:
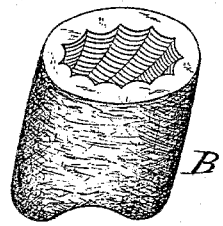
Figure 6:
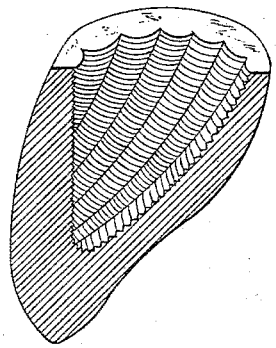
Figure 8:
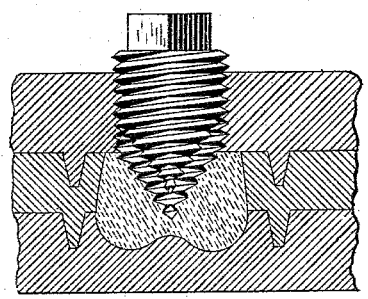

In the accompanying drawings, Figure 1 is a vertically-longitudinal section through a root and crown, showing my improved crown as attached to the root; and Fig. 2 is a similar view of a modified form of crown for incisor teeth. Fig. 3 is a similar section through one of my improved crowns, constructed for the replacement of the natural crown of a bicuspid tooth; and Fig. 4 is a similar view of a similar crown mounted. Fig. 5 is a similar section through a root and crown, the crown being modified by having the vertical post-opening therein extending all the way through the incisor-crown. Figs. 6 and 7 are, respectively, a section of a modified incisor-crown having a spirally-fluted post-opening, and a bottom plan of a bicuspid-crown of the same construction. Fig. 8 is a central sectional view of a mold adapted for molding my improved crowns by means of a screw-plug.

The root A of the tooth is prepared in the usual or in any proper manner, for the reception of the crown B, which is to replace the natural crown, and said artificial crown is securely anchored to the root in a well-known way, preferably by means of a screw or tooth post or posts, as clearly shown in Figs. 1, 2, 4, and 5. The crown has a vertical post-opening, b, extending from its base into the body of the crown, but preferably not entirely through it, as shown in Figs. 1, 2, 3, 4, 6, and 7. The opening, however, may extend through the crown, as shown in Fig. 5. This opening may be straight or tapered; but is preferably tapered from the base of the crown toward its face or cutting or grinding surface, as shown in Figs. 1, 5, 6, and 7.

The interior surface of the walls of the crown-opening is corrugated or provided with, preferably, continuous or progressive retaining grooves or shoulders extending from at or near the base of the crown-well into the body thereof, or through it, if desired. Said corrugations or shoulders may be formed by annular threads or grooves, and said threads are preferably screw-threads or progressive threads, as clearly shown in Figs. 1, 2, 3, 4, and 5; but a very desirable manner of forming this corrugation or series of grooves or shoulders is shown in Figs. 6 and 7, where the interior walls of the post-opening are spirally fluted with the larger end of the spiral flutes at the base of the crown, as clearly shown in said figures. The corrugation of the inner walls of the crown is formed, preferably, by progressive or continuous grooves or shoulders, as above stated, and the projecting points of the shoulders may be either strictly angular, as shown in Figs. 1, 3, and 5, or be formed by concave grooves, as shown in Figs. 2 and 4, or the shoulders or corrugations may be formed by the convex spiral flutes, as shown in Figs. 6 and 7. By constructing the crown with the corrugations or series of grooves or shoulders extending from at or near the base of the crown-well into, and in some cases through, the body thereof, the crown may be cut or ground in different directions at its base in fitting it to the end of the root to secure proper occlusion, and by cutting off or across one or more of the shoulders or grooves the retaining capacity of the crown is not destroyed, but it will, in all practicable cases, still have one or more retaining points or shoulders, whereby my improved crown has a wider range of application than those heretofore constructed or suggested, as far as I am aware, and enables many operations to be performed which would otherwise require the removal of the entire natural root from the mouth. In addition to this, the crowns may be cheaply and rapidly manufactured, while, when applied to the root, the crown cannot be displaced under ordinary service.

Prior to applying the crown it is desirable that the outer end of the root to which the crown is to be fitted should be slightly concaved or hollowed out, as clearly illustrated in the drawings, for the reception of the plastic securing material hereinafter mentioned.

In applying the crown the base of the crown is cut or ground to fit the particular shape of the prepared end of the root. The retaining-screws are then securely tamped or screwed in place in the root, and the crown is then filled with cement or amalgam—for example, such as that now commonly used by dentists for the purpose of securing artificial crowns to roots. The crown is then pressed to its place on the root with the pin, screw, or post entering or projecting into the post-opening of the crown, and as soon as the cement or amalgam sets or hardens the crown will be firmly secured in place, and the tooth thus repaired will have the same, or practically the same, capabilities for use and comfort as a wholly natural tooth.

My improvement is based on the well-known Mack form of artificial tooth-crown, and my particular object in devising this improvement was to give practical utility to such form of crown, and enable such crowns to be readily manufactured, the advantages of which will be obvious to manufacturers and to dentists familiar with the construction and application of artificial tooth-crowns to natural teeth.

In Fig. 8 I have shown one way of making my improved crowns in a somewhat exaggerated form for better illustration. The plastic material or porcelain from which the crown is to be made is placed in the mold under an opening in one section of the mold, in which a plug screws back and forth. The plug has a forming point or end to correspond with the shape to be given to the post-opening in the crown. In operation the plug is screwed down the proper distance in the crown to form the post-opening and corrugate its walls, and is then removed by a reverse motion, as will be obvious.

All the patentable matter disclosed and not particularly claimed herein is reserved as the subject-matter of a future application or applications which will be filed by me.

Prior to stating my claims it may be well to say that I am aware of the artificial tooth-crown shown in the patent of Gates, dated March 1, 1881. That crown, however, has no progressive or continuous shoulders or corrugations, nor a series of annular grooves, and is not at all like my improved crown, and does not have its capabilities. The Gates crown has pits or grooves opposite each other, and two sets of such pits or grooves, one at or near the base of the crown to constitute a retaining-surface for the amalgam filling, while the other is near the top or in the coronal opening of the crown to retain the final plug or stopper of amalgam, which is filled in from the top. Were the base of the Gates crown cut away to an extent to remove the pitted or grooved part, which is very often required in practical operation, the Gates crown would be unfit for use, as it could not be securely fastened to the root, the upper set of pits being too far removed from the place of joining to effect a secure attachment of the crown to the root. With my improvement the crown can be cut away to any desired practical extent or at any angle, and there will be still left retaining-surfaces to secure the crown firmly to the root.

Having thus fully described my invention, what I claim as new, and desire to secure by Letters Patent, is—

1. An artificial tooth-crown, having an opening extending from its base or neck into the body thereof, the interior walls of said opening being provided with a continuous longitudinally-curved or spiral groove or shoulder commencing at or near the base and extending well into the crown, substantially as described.

2. An artificial tooth-crown having an opening extending from its base into the body thereof, the inner walls of said opening being corrugated or provided with a series of annular grooves commencing at or near the base of the crown and extending well into the body thereof, substantially as described.

In testimony whereof I have hereunto subscribed my name.

WOODBURY S. HOW.

Witnesses:
J. A. B. WILLIAMS,
S. E. CAMPBELL.